Patented Oct. 16, 1934

1,977,412

UNITED STATES PATENT OFFICE 1,977,412

INSECTICIDE

Ray E. Spokes, Ann Arbor, Mich., assignor to Edgar A. Murray Company, Detroit, Mich., a corporation of Michigan No Drawing. Application February 11, 1933, Serial No. 656,375

4 Claims. (Cl. 167—37)

This invention relates to insecticides particularly adapted for combating the common moth in all its forms and especially the destructive larvæ form.

In my co-pending application, Serial No. 642,931, filed November 16, 1932, I have described an insecticide which when sprayed upon a fabric or the like penetrates deeply to destroy moth eggs and larvæ irrespective of their location in the fabric. This insecticide includes an active ingredient which may crystallize and if this occurs the active ingredient may be brushed from or dusted off the fabric particularly when it has been sprayed on clothing stored in a closet to which access is frequently had. It is therefore the salient object of this invention to provide an insecticide which will penetrate deeply into fabrics but which will not dust off from the fabric to which it has been applied.

Other objects of the invention are to prevent crystallization of the active ingredient of an insecticide; to effectively bond the insecticide to the fibers of the fabric; and to provide an insecticide which will not render the fabric greasy either in appearance or to touch when the insecticide is applied to the fabric.

In carrying my invention into effect I prefer to use as the active toxic ingredient of the insecticide a 2% solution of 3 chlor 4 hydroxy diphenyl which exhibits a crystalline characteristic and a highly volatile non-greasy vehicle or base such as non-greasy petroleum naphtha in which the active ingredient is readily soluble. To this solution I add a bonding or protective agent such as ½% by weight of either a vegetable wax, an animal wax, or a mineral wax such as mineral scale wax. I prefer to use 95% by weight crude scale paraffin wax and 5% by weight stearic acid anilide, sometimes called stear-anilide, having the formula $C_{17}H_{35}CO-NH_2$. The addition of stearic acid anilide to the wax renders it non-greasy and reduces the crumbling character exhibited by both the higher melting point paraffin crystalline waxes and the lower melting point softer waxes. Stearic acid anilide may be used advantageously whenever the active ingredient of an insecticide exhibits a crystalline characteristic.

The agent such as a wax may be added to any insecticide in which a hydrocarbon solvent is used or in any insecticide in which the solvent used is a distillate of petroleum, coal tar, or organic matter.

The addition of the wax to an insecticide prevents crystallization of the active ingredient of the insecticide and thus prevents dusting off the insecticide from a fabric to which it is applied for the wax provides an effective bond to the fibers of the fabric and does not interfere with the penetrating and other highly desirable properties of an insecticide having a highly volatile non-greasy vehicle or base. Likewise, the addition of wax of the above described character to an insecticide does not render the fabric to which the insecticide is applied either greasy in appearance or to touch.

I have described a particular form of wax and treatment therefor for use in an insecticide but I do not wish to be limited to the precise details set forth but desire to avail myself of such changes and alterations as fall within the purview of the following claims.

I claim:

1. An insecticide adapted for combating moths or the like and including a highly volatile non-greasy petroleum base having a chlorine-hydroxy substituted diphenyl exhibiting a crystalline characteristic dissolved therein, and having crude scale paraffin wax and stearic acid anilide to provide an effective bond to the fabric and to prevent crystallization of the active ingredient and dusting off from a fabric to which the insecticide is applied.

2. An insecticide adapted for combating moths or the like and including a highly volatile non-greasy petroleum base having a chlorine-hydroxy substituted diphenyl exhibiting a crystalline characteristic dissolved therein, and containing a bonding agent consisting of 95% by weight crude scale paraffin wax and 5% by weight stearic acid anilide to prevent crystallization of the active ingredient and dusting off from a fabric to which the insecticide is applied.

3. An insecticide for combating common moths and the like and including a highly volatile non-greasy petroleum naptha base and 3 chlor 4 hydroxy diphenyl exhibiting a crystalline characteristic dissolved in said base, and containing ½% by weight of a bonding agent consisting of 95% by weight crude scale paraffin wax and 5% by weight stearic acid anilide to prevent crystallization of the active ingredient and dusting off from a fabric to which the insecticide is applied.

4. An insecticide adapted for combating moths or the like and including a highly volatile non-greasy petroleum base having a chlorine-hydroxy substituted diphenyl exhibiting a crystalline characteristic dissolved therein, and a mineral scale wax and stearic acid anilide to prevent crystallization of the active ingredient and dusting off from a fabric to which the insecticide is applied.

RAY E. SPOKES.